Figure 1:
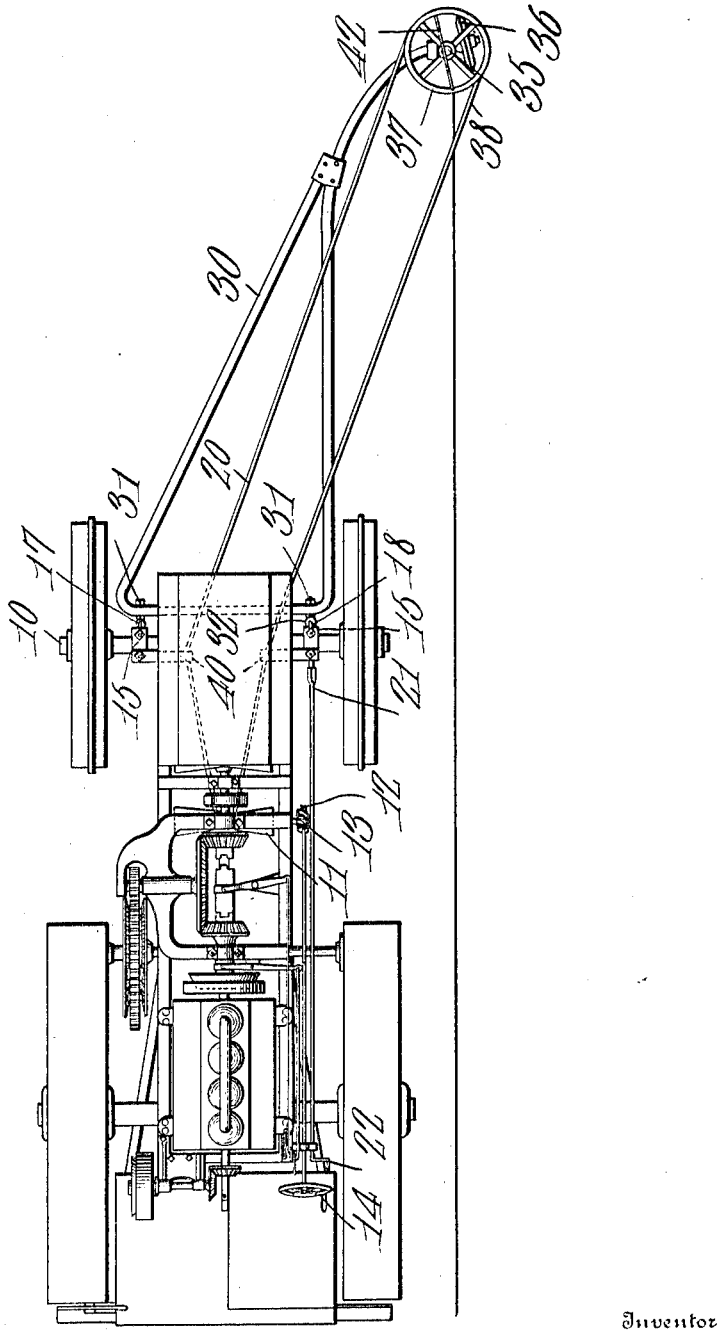

D. M. HARTSOUGH.
PILOT FOR TRACTION ENGINES.
APPLICATION FILED JAN. 29, 1908. RENEWED APR. 26, 1909.

1,096,784.

Patented May 12, 1914.

2 SHEETS—SHEET 1.

Witnesses

Inventor
D. Maurice Hartsough.
By C. A. Snow & Co.
Attorneys

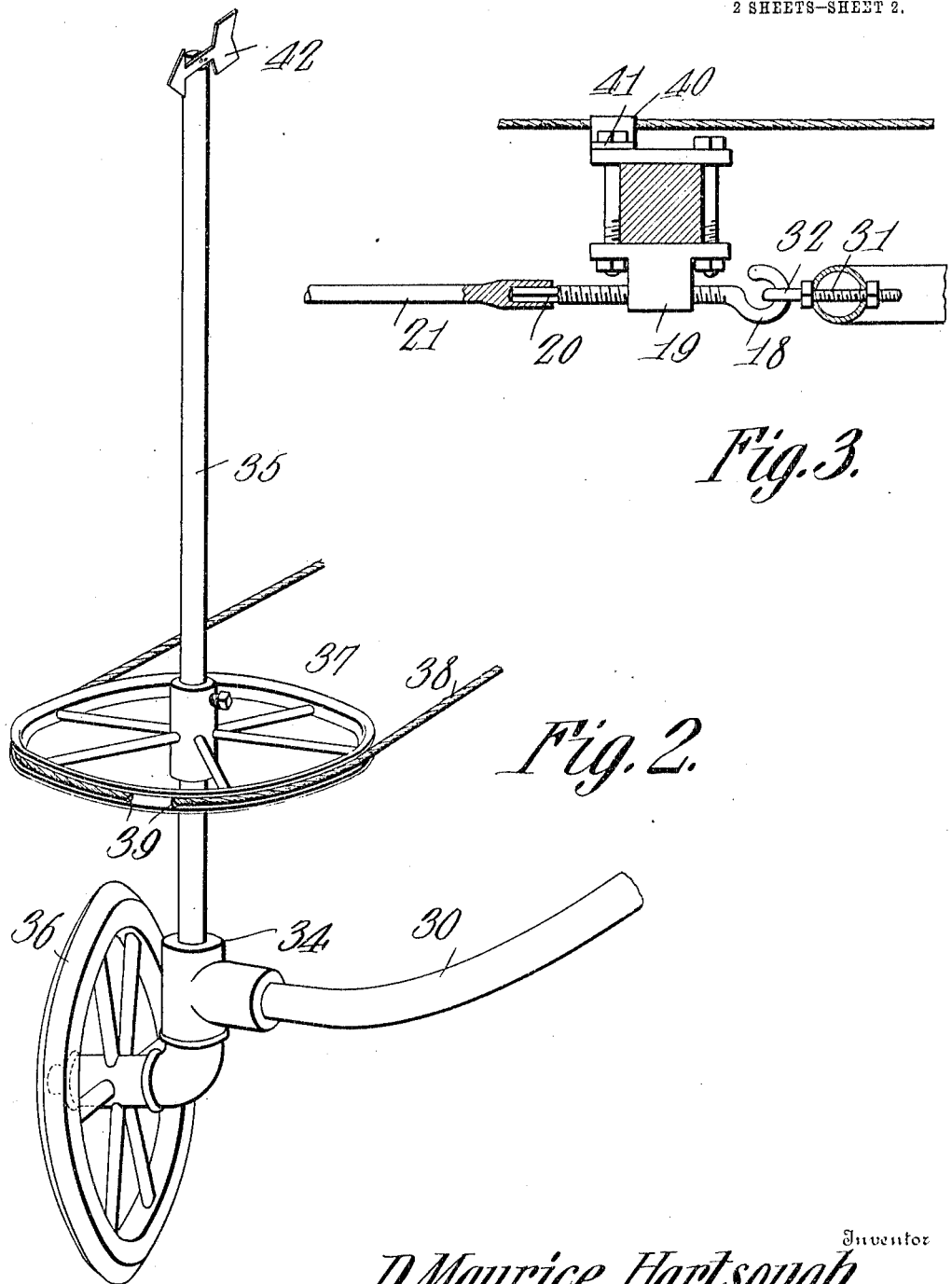

UNITED STATES PATENT OFFICE.

D MAURICE HARTSOUGH, OF MINNEAPOLIS, MINNESOTA.

PILOT FOR TRACTION-ENGINES.

1,096,784.  Specification of Letters Patent.  Patented May 12, 1914.

Application filed January 29, 1908, Serial No. 413,286. Renewed April 26, 1909. Serial No. 492,320.

*To all whom it may concern:*

Be it known that I, D MAURICE HARTSOUGH, a citizen of the United States, residing at Minneapolis, in the county of Hennepin and State of Minnesota, have invented a new and useful Pilot for Traction-Engines, of which the following is a specification.

This invention relates to piloting or steering devices for agricultural machinery, and more particularly to power operated plows.

The object of the invention is to provide a piloting means, arranged to guide a traction engine, drawing one or more plows, said means traveling in a previously formed furrow and directing the engine in a course parallel with the furrow, so that the plows will travel in a like direction.

A further object is to provide a piloting means capable of oscillation in the furrow to vary its angle with respect thereto and operable from the engine.

A further object is to provide means, supporting the pilot device on the engine and capable of horizontal adjustment to adapt the engine for use with a varying number of plows.

In the accompanying drawings, Figure 1 is a plan view of a traction engine provided with a piloting device constructed in accordance with the invention, Fig. 2 is a detail, perspective view of the forward end of the piloting device, detached. Fig. 3 is a transverse, sectional view on an enlarged scale through the front or steering axle of the engine.

The engine may be of ordinary construction, having a steering axle 10 and a winding drum 11, the shaft of which has a worm wheel 12 meshing with a worm 13 on a shaft, which extends toward the rear of the engine and is provided with an operating crank 14. Usually the winding drum is connected to clips 15 on the axle 10 by chains or the like and by turning the winding drum, one chain may be wound and the other one unwound to steer the engine. In the present invention, the ordinary steering chains are detached and a cable 20 is employed for the purpose of changing the angle of the pilot wheel hereinafter referred to, and having no direct connection with the front axle of the engine. Axle clips 15 carry hooks 17 and 18 respectively, the shank of the hook 18 being threaded and passing through a threaded opening formed in the lower block 19 of the clip, while the rear end of said shank is non-circular in form, as indicated at 20, to fit a socket formed in the end of a shaft 21, which extends to a position near the operator's platform and has a crank 22 to permit the turning of the hook 18 to adjust its position, as will hereafter appear.

In front of the engine is a frame 30, preferably in the form of a triangle, the shorter side of the frame having bolts 31 with rearwardly extending eyes 32, which engage with the hooks 17 and 18. The shorter side of the triangle is normally arranged parallel with the axle, but by adjusting the screw hook 18, the frame may be horizontally oscillated for the purpose of allowing the engine to travel a greater or less distance from the previously formed furrow, according to the number of plows used. When the frame 30 has been adjusted properly for a given number of plows, it need not be moved again, the guiding of the engine being accomplished through the furrow pilot. This adjustment may be effected by loosening the nuts illustrated as on the bolts 31 and then turning the threaded hooks 18 in the threaded block 19, so as to adjust the parts, or, if desired, the hook 18 may be disengaged from the eye 32 and the hook 18 then turned to adjust its length and then coupled again to the eye 32, as will be apparent. A delicate adjustment of the guiding apparatus may be obtained by the movement of the hook 18, but for general purposes, the machine will be guided through the oscillation of the guiding wheel and its connection with the drum 11.

An arm or pointer 42 is preferably provided on the shaft 35 parallel with the plane of the pilot wheel to enable the operator to accurately determine the angle of the wheel. The frame 30, at its forward end, is provided with a vertically disposed bearing block 34, in which a shaft 35 is mounted. The lower end of this shaft has a right-angled bend therein and carries a pilot wheel 36, which is adapted to contact with the wall of the furrow, formed by the land side of the plow and the periphery of the wheel is tapered or V-shaped in cross section, so that the wheel may be turned at an angle to the furrow without presenting an edge to the land side, which would result in the climbing of the wheel. A grooved wheel 37 is mounted on the vertical shaft and carries a steering cable 38, which passes through openings 39 in the frame of the wheel, and the leads of the cable extend rearwardly through the eyes 40 formed on the arms 41, which are detachably secured to the clips 15, the eyes 40 being equi-distant from the longitudinal center of the machine. The leads of the cable pass around the steering drum 11 by the operation of which the angular position of the pilot wheel may be changed. The pilot wheel acts through the frame 30 to maintain the steering axle 10 in the proper position, so that the traction engine and plows will travel in a course parallel with the previously formed furrow and the wheel will be entirely within the control of the operator on the engine.

I claim as my invention:—

1. In combination, a traction engine, a pilot located in advance of the engine and positioned to run only in the furrow and bear against the side wall thereof, and means operatively connected with said pilot and operable from the engine for oscillating the pilot to change its angular position.

2. In combination, a traction engine, a pilot located in advance of the engine in position to run only in the furrow and bear against the side wall thereof and arranged to oscillate on a vertical axis, and means operatively connected with said pilot and operable from the engine for oscillating the pilot to change its angular position.

3. In combination, a traction engine, a frame projecting forward of the engine, a pilot having a vertical axis in said frame in advance of the engine and arranged to run only in the furow and bear against the side wall thereof, and means operatively connected with said pilot and operable from the engine to change its angular position.

4. In combination, a traction engine, a pilot located in advance of the engine and arranged to run only in the furrow and bear against the side wall thereof and to oscillate about a vertical axis, and means operatively connecting said pilot with the steering mechanism of the engine.

5. In combination, a traction engine, a frame connected thereto and extending forward of the engine, an oscillating furrow pilot-wheel carried by said frame in position to bear against the side wall of the furrow, and means operable from the engine for oscillating said wheel.

6. The combination, with a traction engine, of a steering frame projecting forwardly therefrom, an upright shaft journaled in said frame, a furrow pilot wheel carried by said shaft and arranged to travel in a furrow and bear against its side to guide the engine, and means operable from said engine to oscillate said shaft and wheel.

7. The combination, with a traction engine, of a steering frame extending forward of the engine, an oscillating pilot wheel carried by said frame and arranged to travel in a furrow and bear against its side to guide the engine, and means including an upright shaft, and wheel and an operating cable therefor, to oscillate said pilot wheel from said engine.

8. The combination, with a traction engine having a steering drum and provided with a pivoted steering axle, of a guiding frame connected to said axle, a vertical shaft mounted at the forward end of said frame, a furrow pilot wheel carried by said shaft, a shaft adjusting wheel mounted on said shaft, and an operating cable extending from said shaft adjusting wheel to said drum.

9. In combination, a traction engine, having a steering axle, a guiding frame connected with said axle, an upright shaft at the forward end of the frame, the lower end of the shaft being turned to form an approximately horizontal portion, a furrow pilot wheel on the horizontal portion of the shaft and arranged to travel in a furrow and bear against its side to guide the engine, and means for turning the shaft to adjust the angular position of said wheel.

10. In combination, a traction engine having a steering drum and provided with a steering axle, a frame connected to the axle, a vertical shaft journaled at the forward end of the frame, a short horizontal arm carried by said vertical shaft, a furrow pilot wheel on the horizontal arm, an adjusting wheel carried by the vertical shaft, a cable extending around the adjusting wheel and secured thereto, the opposite runs of the cable extending rearwardly to said steering drum whereby the operator may oscillate said wheel to guide the engine.

11. In combination, a traction engine having a steering axle, a pair of hooks carried by the axle, means for adjusting one of the hooks, a frame having eye bolts connected to the hooks and extending forward of the engine, and a furrow pilot wheel at the forward end of said frame.

12. In combination, a traction engine having a steering axle, a pair of clips on said axle, hooked rods carried by the clips, one of said rods being threaded to permit endwise adjustment, an operating rod connected to the threaded rod and extending to the rear end of the engine, a frame having eye bolts pivotally mounted upon the hooks and extending forward of the engine, and a furrow pilot wheel arranged at the forward end of said frame.

13. In combination, a traction engine, a furrow pilot wheel arranged to oscillate on a vertical axis and to travel in a furrow and bear against its side to guide the engine, means supporting the same in advance of the engine, and a belt operatively connected with said wheel and extending back to the engine whereby a person on the engine can oscillate said wheel to guide the machine.

14. In a traction engine, a furrow pilot wheel arranged to oscillate on a vertical axis and bear against the side of a furrow and having a beveled face to contact with the side of the furrow, a support for sustaining the pilot wheel in advance of the engine to engage the said wheel with the side of the furrow, and means operable from the engine for oscillating the pilot wheel.

15. In a traction engine, the combination with its front axle capable of oscillation with respect to the body of the engine, a frame connected with the front axle to oscillate in a vertical plane and extending in advance of the engine, an oscillating furrow pilot wheel mounted on the forward part of said frame in position to bear against the side of a furrow, and means operable from the engine for oscillating said pilot wheel.

16. The combination, with the steering axle of a traction engine, of a frame projecting forwardly therefrom and adjustable in a horizontal plane with respect to said axle, a pilot wheel carried by said frame, and means for locking said wheel at a predetermined angle to said frame.

In testimony that I claim the foregoing as my own, I have hereto affixed my signature in the presence of two witnesses.

D MAURICE HARTSOUGH.

Witnesses:
  CHARLES T. THOMPSON,
  A. V. A. PETERSON.

Copies of this patent may be obtained for five cents each, by addressing the "Commissioner of Patents, Washington, D. C."